Patented Jan. 5, 1954

2,665,257

UNITED STATES PATENT OFFICE 2,665,257

LEAK DETECTOR COMPOSITION FOR GASEOUS FLUID CONDUITS AND THE LIKE

Thomas W. Potter, Mattoon, Ill.

No Drawing. Application December 19, 1950, Serial No. 201,697

3 Claims. (Cl. 252—307)

This invention relates to the detection of leaks in conduits and vessels containing gaseous fluids under pressure and is especially directed to a composition of matter useful for forming a film into which the gaseous fluid escaping from a leak may be trapped in bubbles sufficiently persistent to permit location of the leak by visual observation, even though the gaseous fluid be escaping only through a minute aperture imperceptible to the naked eye.

Pipes, fittings, conduits, valves, and containers or reservoirs constituting systems for air, steam, cooking gas and the like in railroad cars, are tested after installation by applying fluid pressure thereto and determining from a decline in the pressure whether or not leaks exist, and if the pressure loss in a given time exceeds an established standard approval of the entire system is withheld. In some such instances the leakage may occur at a localized point as in a fitting or the like amenable to repair or replacement without disturbing the remainder of the system but it has heretofore been difficult if not impossible under certain conditions accurately to locate such points. Soap solutions are often applied externally to the parts of such systems as with a brush and the soaped surfaces then observed for bubbles created by the leaking gaseous fluid but such bubbles are evanescent in character since soaps afford only relatively fragile films while in some instances the bubbles may be so small as to escape detection especially where inadequate lighting interferes with their observation. Moreover many soaps do not form sufficiently persistent bubbles with the water available in certain parts of the country and special soaps and/or water must be provided in these areas, while irrespective of the character of the soap and/or water used the introduction of antifreeze components to the solution destroys its capacity for formation of bubbles which makes this method of testing useless under freezing conditions. In some instances during cold weather or when suitable ingredients for an acceptable soap solution are not available air and steam lines have been tested by passing a lighted blow torch near them and observing the deflection of the blow torch flame by the jet of air or steam issuing from a leak, but obviously this method cannot be used for testing leaks in systems containing propane, natural gas or other inflammable gaseous fluids while in any case it presents some fire hazard since a workman intently observing the burner flame for effects of possible leaks in a surface near which the flame is being passed may inadvertently direct it toward inflammable material especially when operating in restricted space such as beneath the floor of a railroad car or adjacent structural parts of a building.

It is therefore a principal object of the invention to provide a novel composition of matter adapted for use in connection with conduits and containers for gaseous fluids to facilitate the discovery of defective and leaking elements and location of the exact situs of the leak.

It is a further object to provide a composition miscible with water to produce a liquid applicable to the surface of the part to be tested to form a film which when a leak is encountered immediately creates bubbles of substantial size and persistence readily separating from the part while the liquid retained on the surface thereafter dries without leaving unsightly and objectionable soiling or a dust collecting smear.

Further objects, purposes and advantages of the invention will hereafter more fully appear or will be understood from the following description of a preferred embodiment of it especially adapted for use in testing air, steam and gas systems and locating leaks therein through which the contained gaseous fluid may be escaping.

It will be understood that satisfactory bubble testing of a system of this character to determine the presence and precise whereabouts of leaking conditions requires a liquid which can form with the gaseous fluid in the system relatively large and numerous bubble envelopes with high film strength, adequate persistence and capacity for readily separating from the surface on which they are formed, so as to float freely in the air when filled with gaseous fluid of low density. Particularly when the bubbles detach themselves readily from the surface a rough indication of the point of their origin can readily be observed from a considerable distance and this is of material advantage in testing the air, gas and steam systems of railroad cars in which conduits, reservoirs and the like are disposed beneath the car floor. The liquid used for this purpose should also be capable of wetting all surfaces to which it is applied and yet leave no unsightly residue after it has served its purpose and its volatile constituents have evaporated, while in territories which normally experience severe winter weather a liquid is required which is capable of performing its functions in sub-freezing temperatures as well as at higher ones. Obviously in view of what has been said soap solutions inadequately meet these requirements even under the most favorable conditions while they cannot be used at all in freezing weather, the addition of anti-freeze components destroying their capacity for foaming or forming bubbles of appreciable persistence in point of time.

The composition of this invention however is suitable for use under substantially all conditions, and being compatible with denatured alcohol and other common anti-freeze components may be used at temperatures at low as —40° F. or perhaps lower when such components are added in suitable quantity. Consequently by use of the composition testing under substantially any conditions likely to be encountered is greatly facilitated.

The composition to which reference has been made is conveniently first produced as a dry comminuted solid containing a number of ingredients and it may be compounded as follows:

A sodium alkyl aryl sulfonate, such as the product available on the open market and now being sold by the Monsanto Chemical Co. under the trade designation "Santomerse," the active constituent of which is dodecyl benzene sodium sulfonate, constitutes about 25–45 parts of the dry material; to it is added about 20–40 parts of a mixture consisting of approximately 85% by weight of an alkyl sulfonate or a sulfated alcohol such as the technical lauryl sodium sulfate now being marketed by E. I. du Pont de Nemours & Co. under the trade designation Duponol W. A. and approximately 15% sodium benzoate or magnesium carbonate, the latter two ingredients being substantially interchangeable in the mixture. About 10–30 parts of defatted soy bean flour or other relatively high protein colloidal substance containing less than 10% oils is included with the foregoing ingredients together with about 1–9 parts sodium carboxymethylcellulose or any suitable methylcellulose ether and about 5–15 parts of sodium sulfite ($Na_2SO_3$). A total of 100 parts by weight of these ingredients as comminuted solids within the stated ranges are mixed dry until thoroughly intermingled and uniformly distributed throughout the mass which may be stored for extended periods without caking or otherwise suffering impairment of any of its essential characteristics. When used for making the testing liquid about 2 oz. of the dry material is added to one gallon of water and thoroughly stirred therein, the liquid then containing a perceptible colloidal suspension comprising a portion of the colloidal protein flour, the other constituents of the dry material, and/or their reaction products entering into solution. This liquid, usually faintly yellowish and slightly cloudy in appearance may be used under substantially all circumstances for testing as described when the temperature is above or not too far below freezing even when the liquid is partially frozen to a slushy mass although use in this latter condition tends to result in waste. When the temperature is considerably below freezing a suitable non-freezing mixture of alcohol or other anti-freeze component and water may be utilized instead of water alone in approximately the same proportion of one gallon to about 2 oz. of the dry material.

So far as I have ascertained when the ingredients of my composition are intermingled in the dry state no appreciable chemical reaction occurs between them. However when made into a liquid solution-suspension by addition of water alone or a water and alcohol mixture, some chemical reaction is believed to occur although its nature has not been precisely determined. The liquid however forms larger and more persistent bubbles, forms them more readily and they separate more readily from the surface on which they are formed as compared with soap solutions, solutions of any of the said ingredients individually or any known combination thereof not within the ranges indicated herein, while the liquid leaves no unsightly residue on surfaces to which it is applied after evaporation of its volatile constituents.

When the liquid is applied to the object being tested by a brush or other suitable implement the coating of the liquid is sufficient to permit formation of a substantial number of bubbles at any points where the gaseous fluid is leaking from the surface; where it contains no leaks although wetted by the liquid a substantial proportion thereof normally drains away and nothing more than an almost imperceptible film remains after drying by natural evaporation into the atmosphere, the unsightly smudges or smears left by soap solutions which tend to collect dust and dirt being wholly absent when my composition is employed.

This liquid has been used satisfactorily for detection of leaks in propane, natural gas, air and steam systems, bubbles thereof formed by escaping steam having attained diameters of several inches before floating freely into the atmosphere where they persisted for several minutes. Of course the persistence of the bubbles, particularly when containing steam, depends to some extent on the atmospheric conditions since when the relative humidity is low especially at high temperatures the volatile matter in the liquid and hence in the film, comprising primarily water and in some instances alcohol as well, evaporates relatively quickly with resultant collapse of the bubbles more rapid than at higher relative humidity and/or lower temperature.

It is apparently substantially immaterial whether or not the water employed in making the liquid is chemically pure and the liquid is equally effective whether compounded from hard or soft water and in fact may successfully be made from sea water if desired although it is desirable that the pH of the liquid be in the range of 7 to 9 which when non-basic water is used normally requires the larger proportions of sodium sulfite within the range mentioned. With the pH value maintained at 7–9 the liquid does not readily enter into or promote electrolytic action; hence it may be placed in zinc galvanized or tinned ferrous metal containers and the like without injury to them.

It is believed that the bubbles formed from a film of said liquid comprise complex organic micelles which impart thereto relatively great strength and ability to persist in substantially spherical form for a duration of up to several minutes.

Thus while I have herein described my invention with particular reference to its adaptability for use by railroads in connection with the testing of steam, air and gas systems in railroad cars for the detection of leaks therein, I do not desire or intend to be limited or confined thereto in any way as it will be apparent that my novel composition may be employed in substantially any situation for the detection of escaping gaseous fluids and that within the ranges of the proportions of the ingredients to which reference has been made numerous modifications of the specific composition will readily occur to those skilled in the art and may be employed if desired without departing from the spirit and scope of the invention as defined in the appended claims.

Having thus described my invention, I claim and desire to protect by Letters Patent of the United States:

1. In a composition of matter for mixture with water to produce a bubble-forming liquid, the combination of approximately 25 to 45 parts dodecyl benzene, sodium sulfonate, 20 to 40 parts of a mixture comprising 85% lauryl sodium sulfate and 15% of a compound adapted to promote the free flowing characteristics of the alkyl sulfonate in a substantially dry state selected from the group consisting of sodium benzoate and magnesium carbonate, 10 to 30 parts defatted high protein vegetable flour, 1 to 9 parts of a compound selected from the group consisting of sodium carboxymethylcellulose and methyl cellulose ethers, and 5 to 15 parts of sodium sulfite to make a total of 100 parts by weight.

2. A composition of matter comprising by weight 25% to 45% dodecyl benzene, sodium sulfonate, 20% to 40% a mixture containing 85% lauryl sodium sulfate and 15% sodium benzoate, 10% to 30% defatted soy bean flour, 1% to 9% sodium carboxymethylcellulose and 5% to 15% sodium sulfite to total 100%, said composition being miscible with water and when combined therewith in a proportion of about 2 oz. of said composition to one gallon of water provides a liquid forming into self sustaining bubbles upon injection of a gaseous fluid thereinto.

3. A composition of matter comprising by weight 25% to 45% dodecyl benzene, sodium sulfonate, 20% to 40% a mixture containing 85% lauryl sodium sulfate and 15% magnesium carbonate, 10% to 30% defatted soy bean flour, 1% to 9% sodium carboxymethylcellulose and 5% to 15% sodium sulfite to total 100%, said composition being miscible with water and when combined therewith in a proportion of about 2 oz. of said composition to one gallon of water provides a liquid forming into self sustaining bubbles upon injection of a gaseous fluid thereinto.

THOMAS W. POTTER.

References Cited in the file of this patent

UNITED STATES PATENTS

| Number | Name | Date |
|---|---|---|
| 1,428,207 | Biddle | Sept. 5, 1922 |
| 2,042,359 | Putt | May 26, 1936 |
| 2,154,231 | Daimler et al. | Apr. 11, 1939 |
| 2,469,045 | La Vietes | May 3, 1949 |

FOREIGN PATENTS

| Number | Country | Date |
|---|---|---|
| 485,194 | Great Britain | May 16, 1938 |